US010479104B2

(12) United States Patent
Oguchi

(10) Patent No.: US 10,479,104 B2
(45) Date of Patent: Nov. 19, 2019

(54) OPTICAL MODULE AND ELECTRONIC APPARATUS

(71) Applicant: Seiko Epson Corporation, Tokyo (JP)

(72) Inventor: Satoshi Oguchi, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/037,875

(22) Filed: Jul. 17, 2018

(65) Prior Publication Data

US 2019/0023023 A1 Jan. 24, 2019

(30) Foreign Application Priority Data

Jul. 18, 2017 (JP) ................................ 2017-138795

(51) Int. Cl.
| | | |
|---|---|---|
| *G01J 3/02* | (2006.01) | |
| *G01J 3/42* | (2006.01) | |
| *G01J 3/52* | (2006.01) | |
| *B41J 2/21* | (2006.01) | |
| *B41J 29/393* | (2006.01) | |

(52) U.S. Cl.
CPC ........... *B41J 2/2135* (2013.01); *B41J 29/393* (2013.01); *G01J 3/0205* (2013.01); *G01J 3/0216* (2013.01); *G01J 3/0232* (2013.01); *G01J 3/42* (2013.01); *G01J 3/524* (2013.01)

(58) Field of Classification Search
CPC ...... B41J 2/2135; B41J 29/393; G01J 3/0205; G01J 3/0216; G01J 3/0232
USPC ........................................................ 347/5, 19
See application file for complete search history.

(56) References Cited

U.S. PATENT DOCUMENTS

| | | |
|---|---|---|
| 6,431,446 B1 | 8/2002 | Gu et al. |
| 6,655,778 B2 | 12/2003 | Arquilevich et al. |
| 6,764,158 B2 | 7/2004 | Arquilevich et al. |
| 6,905,187 B2 | 6/2005 | Arquilevich et al. |
| 6,984,013 B2 | 1/2006 | Arqullevich et al. |

(Continued)

FOREIGN PATENT DOCUMENTS

| | | |
|---|---|---|
| JP | 2003-179252 A | 6/2003 |
| JP | 2003-229996 A | 8/2003 |

(Continued)

OTHER PUBLICATIONS

Extended European Search Report for Patent Application No. EP18183640.4, dated Dec. 18, 2019 (8 pages).

*Primary Examiner* — An H Do
(74) *Attorney, Agent, or Firm* — Harness, Dickey & Pierce, P.L.C.

(57) ABSTRACT

An optical module includes: a measuring device including a measuring portion that measures light reflected at a measurement position of a measurement target, a light source that radiates light onto the measurement position in a direction crossing a measurement optical axis oriented from the measurement position to the measuring portion, and a window through which light incident on the measuring portion passes; and a shutter that opens and closes the window of the measuring device. The shutter is provided with a reference object disposed closer to the measuring portion side than the measurement position on the measurement optical axis, on a face of the shutter facing the measuring portion when closing the window, and the optical module includes a light guide that guides the light from the light source to the reference object when the window is closed by the shutter.

12 Claims, 13 Drawing Sheets

(56) References Cited

U.S. PATENT DOCUMENTS 8,179,531 B2   5/2012   Flotats Villagrasa et al.
2014/0152990 A1   6/2014   Ehbets et al.

FOREIGN PATENT DOCUMENTS

JP   2012-020423 A   2/2012
JP   2013-205258 A   10/2013

OPTICAL MODULE AND ELECTRONIC APPARATUS

BACKGROUND

1. Technical Field

The present invention relates to an optical module and an electronic apparatus.

2. Related Art

A printer (printing device) that forms an image on a medium by discharging ink drops from an inkjet recording head has been known. During printing, an ink mist from the discharge of the ink drop may adhere to a measuring device such as, for example, an imaging camera or a spectroscope. Thus, there is a risk that the function of the measuring device will deteriorate. To account for this risk, a configuration to suppress the adhesion of the ink mist has been known (e.g., JP-A-2012-20423).

The printing device disclosed in JP-A-2012-20423 discharges an ink drop from an inkjet recording head, and includes a light radiating portion that cures the ink drop that has landed on a medium with light radiated from the light radiating portion. The light radiating portion includes a rotatable cylindrical lens, and generates an air current by rotating the cylindrical lens to suppress the adhesion of an ink mist.

However, in the device disclosed in JP-A-2012-20423, the optical characteristics of the lens are deteriorated because the lens is rotated. Hence, when the above configuration is applied to the measuring device performing a process based on incident light, such as, for example, an imaging camera or a spectroscope, the incident light is distorted due to the rotation of the lens, and thus a highly accurate captured image is not obtained, or spectroscopic measurement accuracy is reduced. Thus, there is a problem in that the accuracy of measurement by the measuring device is reduced.

Further, a reference object such as a white reference plate may be provided in the interior of the printing device in order to calibrate the captured image or spectroscopic measurement result obtained by the optical device or to obtain a reference value in measurement. In this case, it is difficult to suppress the adhesion of an ink mist to the white reference plate, and thus there is a problem in that the measurement accuracy of the white reference plate is reduced which thereby reduces the measurement accuracy in measuring a measurement target based on a measurement result of the white reference plate.

SUMMARY

An advantage of some aspects of the invention is to provide an optical module that can carry out highly accurate measurement, and an electronic apparatus.

An optical module according to an application example of the invention includes: a measuring device including a measuring portion that measures light reflected at a measurement position of a measurement target, a light source that radiates light onto the measurement position in a direction crossing a measurement optical axis oriented from the measurement position to the measuring portion, and a window through which light incident on the measuring portion passes; and a shutter that opens and closes the window of the measuring device, wherein the shutter is provided with a reference object disposed closer to the measuring portion side than the measurement position on the measurement optical axis, on a face of the shutter facing the measuring portion when closing the window, and the optical module includes a light guide that guides the light from the light source to the reference object when the window is closed by the shutter.

In this application example, the measuring device is provided with the window, through which the reflected light from the measurement position passes, on the measurement optical axis of the measuring portion measuring the measurement position, and the optical module includes the shutter opening and closing the window. Therefore, the entry of a foreign matter from the window into the measuring portion can be suppressed by closing the window with the shutter, and a reduction in measurement accuracy due to the deterioration or the like of the measuring portion can be suppressed. Moreover, the reference object for measuring, for example, a reference value for carrying out measurement is provided at a position of the shutter facing the measuring portion when the window is closed by the shutter. For this reason, the measurement of the reference object can be carried out in a state where the window is closed by the shutter, and the adhesion or the like of a foreign matter to the reference object can be suppressed.

On the other hand, when the reference object is provided at a position different from the measurement position, the amount of light from the light source, which is radiated onto the reference object, is smaller than the amount of light radiated onto the measurement position. In contrast, in this application example, the light guide, which guides the light from the light source to the reference object when the window is closed by the shutter, is provided. For this reason, even when the reference object is closer to the measuring portion side than the measurement position, the amount of illumination light to the reference object can be increased. With this configuration, when the measurement of the reference object is performed, a highly accurate measurement result can be obtained.

In the optical module according to the application example, it is preferable that the light guide is a prism that refracts the light from the light source toward the reference object.

In the application example with this configuration, the light guide is the prism, which refracts the light from the light source toward the reference object. With this configuration, the light from the light source can be guided to the reference object with high accuracy, and highly accurate measurement can be performed. Moreover, the incident angle of light with respect to the reference object can be changed according to the refractive index or shape of the prism. Hence, light can be radiated onto the reference object at the same angle as that when the light from the light source is radiated onto the measurement position. In this case, the measurement of the reference object can be performed with the same illumination amount as that when the reference object is disposed at the measurement position.

In the optical module according to the application example, it is preferable that the measuring device includes an illumination window through which the light from the light source is emitted, and that the prism covers the illumination window when the window is closed by the shutter.

In the application example with this configuration, the light emitted through the illumination window is incident on the prism. With this configuration, substantially the same amount as that when the reference object is located at the measurement position can be radiated onto the reference object located closer to the measuring portion side than the measurement position.

In the optical module according to the application example, it is preferable that the light guide includes an irregular reflector that irregularly reflects the light from the light source.

In the application example with this configuration, the light from the light source is irregularly reflected by the irregular reflector, so that the amount of light reaching the reference object located closer to the measuring portion side than the measurement position is increased. With this configuration, the measurement of the reference object can be carried out with high accuracy.

In the optical module according to the application example, it is preferable that the optical module further includes a light transmissive member disposed closer to the measuring portion side than the shutter when the window is closed by the shutter, and that the irregular reflector is provided at a position different from the measurement optical axis when the window is closed by the shutter, on at least one of a first face of the light transmissive member that faces the measuring portion and a second face of the light transmissive member that is located on the side opposite to the first face.

In the application example with this configuration, light is irregularly reflected in the light transmissive member by the irregular reflector provided on the first face or the second face of the light transmissive member. With this configuration, light that is made uniform (the amount of light is increased) by the irregular reflection can be radiated onto the reference object provided at a position of the shutter facing the measuring portion, and highly accurate measurement can be performed on the reference object.

In the optical module according to the application example, it is preferable that the measuring device includes a base in which the window is provided, that the shutter closes the window at a position spaced apart from the base to the measurement position side by a predetermined dimension, and that the irregular reflector is provided at a position different from the measurement optical axis when the window is closed by the shutter, on at least one of a face of the base that faces the shutter and a face of the shutter that faces the base.

Also in the application example with this configuration, light is irregularly reflected between the shutter and the base. With this configuration, similarly to the above application example, light that is made uniform (the amount of light is increased) by the irregular reflection can be radiated onto the reference object provided at a position of the shutter facing the measuring portion, and highly accurate measurement can be performed on the reference object.

An electronic apparatus according to an application example of the invention includes: the optical module as described above; and a controller that controls a measuring process performed by the measuring portion.

In this application example, the electronic apparatus includes the optical module described above. Therefore, the entry of a foreign matter can be suppressed by the shutter, the deterioration of, for example, the measuring portion is suppressed, and highly accurate measurement can be carried out. Moreover, the reference object is provided on the measuring portion side of the shutter, and therefore, the adhesion of a foreign matter to the reference object can be suppressed. Further, light can be guided to the reference object by the light guide, and therefore, highly accurate measurement of the reference object can be carried out.

For this reason, even when the measuring process on the measurement target is carried out by the controller in the electronic apparatus, the measuring process based on a measurement result of the reference object measured with high accuracy can be performed.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Hereinafter, a first embodiment of the invention will be described based on the drawings. In the embodiment, a printer 1 (inkjet printer) will be described below as one example of an electronic apparatus including an optical module.

Schematic Configuration of Printer

Figure 1:
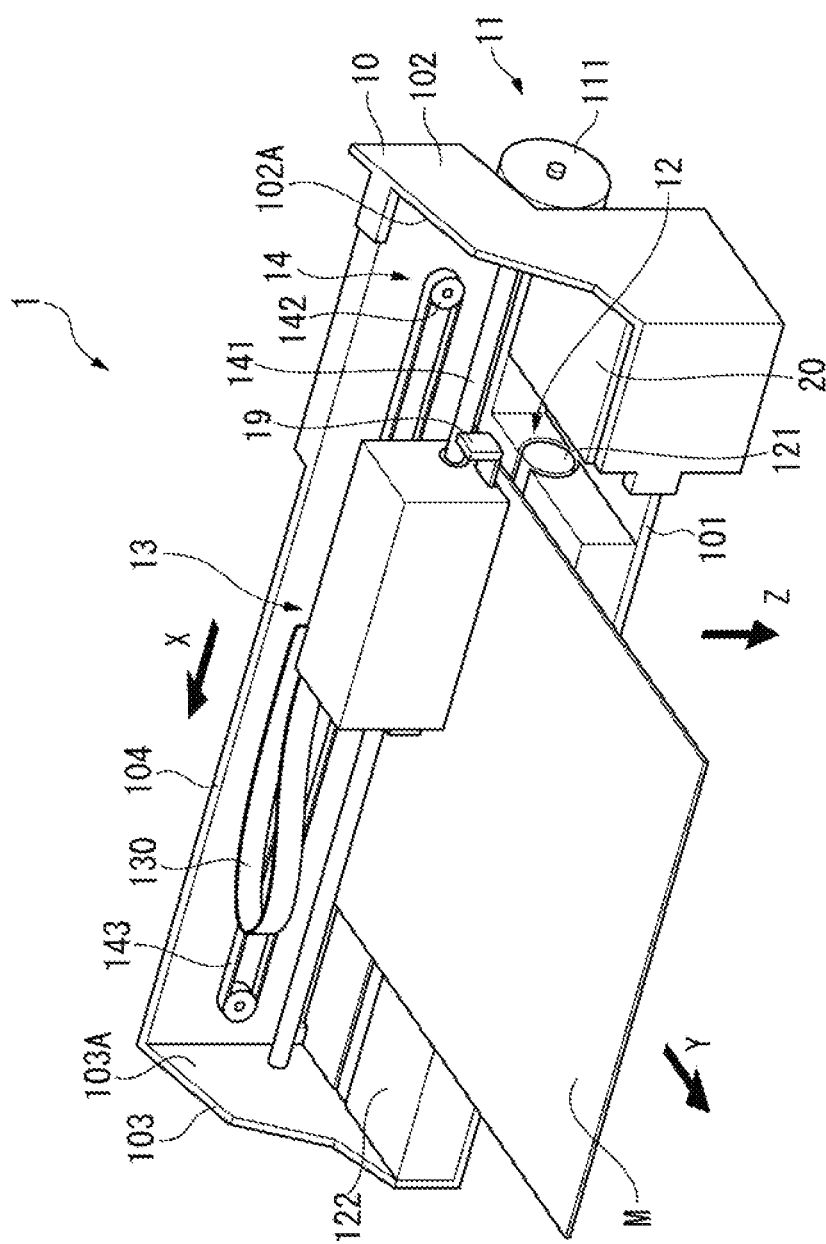
FIG. 1 is an external view showing a schematic configuration of a printer according to a first embodiment.
Figure 2:
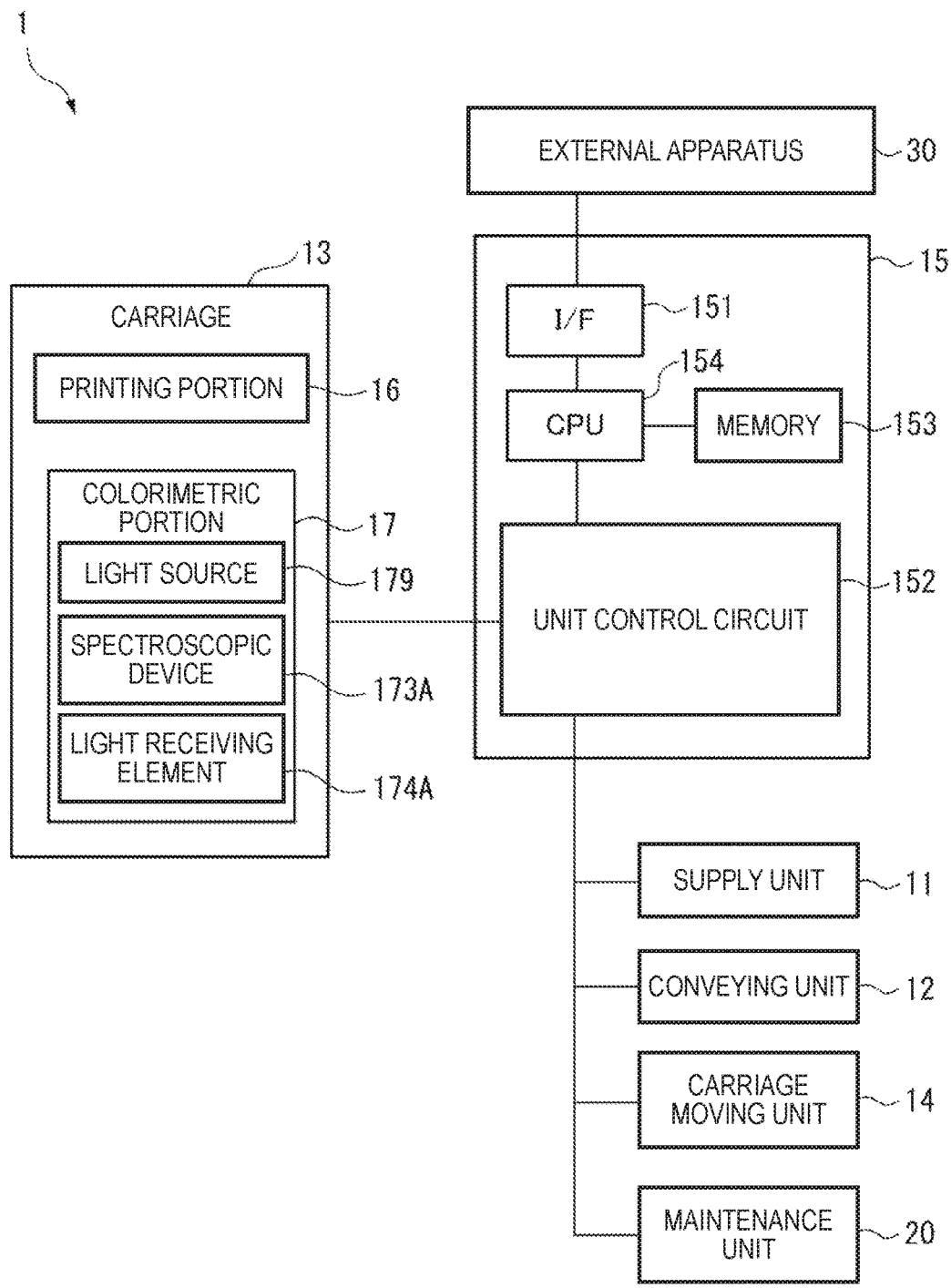
FIG. 2 is a block diagram showing a schematic configuration of the printer according to the first embodiment.
Figure 3:
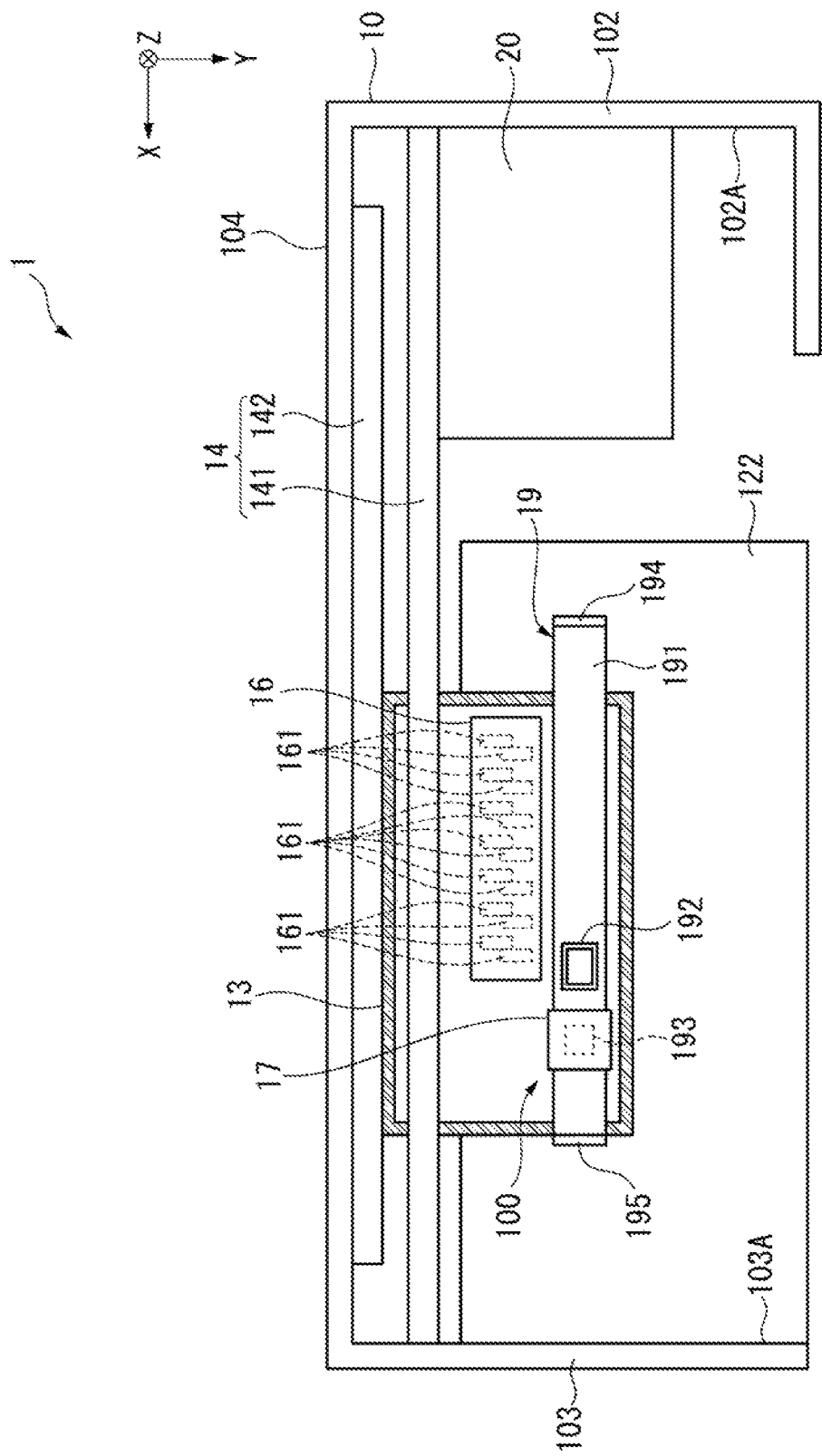
FIG. 3 is a plan view schematically showing the configuration of a main portion of the printer according to the first embodiment.

FIG. 1 is a perspective view showing a configuration example of an external appearance of the printer 1 according to the embodiment. FIG. 2 is a block diagram showing a schematic configuration of the printer 1 according to the embodiment. FIG. 3 is a diagram schematically showing the configuration of a main portion of the printer 1 according to the embodiment.

As shown in FIG. 1, the printer 1 corresponds to an electronic apparatus, and includes a housing 10, a supply 11, a conveyor 12, a carriage 13, a carriage mover 14, a controller 15 (see FIG. 2), and a maintenance module 20. As shown in FIG. 3, the carriage 13 is provided with a printing portion 16, a colorimeter 17, and a shutter mechanism 19 for protecting the colorimeter 17 from a foreign matter such as an ink mist.

The printer 1 configured as described above controls the supply 11, conveyor 12, carriage mover 14, and the carriage 13 based on print data input from an external apparatus 30 such as, for example, a personal computer, and prints an image on a medium M. As this image, for example, a correction pattern for correcting density unevenness can be used. The printer 1 images the correction pattern with the colorimeter 17, and performs various correction processes such as a color shift correction based on a colorimetric result of the correction pattern.

Hereinafter, each configuration of the printer 1 will be specifically described.

The supply 11, conveyor 12, carriage mover 14, controller 15, maintenance module 20, and the carriage 13 are provided in the housing 10. The housing 10 includes a bottom plate 101 on which the conveyor 12, the maintenance module 20, and the like are disposed, and a first sidewall 102, a second sidewall 103, and a back wall 104 upstanding from the bottom plate 101. The first sidewall 102 is located on the −X side. The second sidewall 103 is located on the +X side. The back wall 104 is located between the first sidewall 102 and the second sidewall 103 along the X-direction.

Here, the first sidewall 102 includes a face on which a first end 194 of the shutter mechanism 19 to be described later abuts. The second sidewall 103 includes a face on which a second end 195 of the shutter mechanism 19 abuts. Although not shown in the drawings, the printer 1 includes an external shroud covering at least a portion of the housing 10.

The supply 11 supplies the medium M (in this embodiment, paper) serving as a measurement target to an image forming position. The supply 11 includes a roll body 111 (see FIG. 1) around which, for example, the medium M is wound, a roll drive motor (not shown), and a roll drive gear train (not shown). The roll drive motor is rotationally driven based on a command from the controller 15, and a rotational force of the roll drive motor is transmitted to the roll body 111 through the roll drive gear train. With this configuration, the roll body 111 rotates, and the paper wound around the roll body 111 is supplied to the downstream side (+Y-direction) in the Y-direction (sub-scanning direction).

Although an example of supplying the paper wound around the roll body 111 is shown in the embodiment, the invention is not limited to this example. The medium M may be supplied by any supplying method, for example, by supplying media M such as papers loaded on a tray or the like, for example, one by one by a roller or the like.

The conveyor 12 conveys the medium M supplied from the supply 11 along the Y-direction. The conveyor 12 is configured to include a conveying roller 121, a follower roller (not shown) disposed to interpose the medium M between the conveying roller 121 and the follower roller and following the conveying roller 121, and a platen 122.

A driving force from a conveying motor (not shown) is transmitted to the conveying roller 121. When the conveying motor is driven under the control of the controller 15, the conveying roller 121 is rotationally driven by the rotational force of the conveying motor and conveys the medium M along the Y-direction in a state where the medium M is interposed between the follower roller and the conveying roller 121. The platen 122 facing the carriage 13 is provided on the downstream side (+Y side) of the conveying roller 121 in the Y-direction.

The carriage 13 includes a case in which the printing portion 16 printing an image by discharging ink onto the medium M, the colorimeter 17 measuring a color of the image on the medium M, and the shutter mechanism 19 are mounted. The colorimeter 17 corresponds to a measuring device. The colorimeter 17 and the shutter mechanism 19 constitute an optical module 100 (see FIG. 3).

The carriage 13 is moved by the carriage mover 14 along a main scanning direction (X-direction). Detailed configurations of the carriage 13, the printing portion 16, the colorimeter 17, and the shutter mechanism 19 will be described later.

In the following description, the −X side in the main scanning direction (X-direction) may be referred to as "Home side", and the +X side may be referred to as "Full side". Here, the term "Home" indicates the retracted position of the carriage 13 in a standby state where a printing process is not carried out. The term "Full" indicates the side opposite to Home.

The carriage mover 14 causes the carriage 13 to reciprocate along the X-direction based on a command from the controller 15.

The carriage mover 14 is configured to include, for example, a carriage guide shaft 141, a carriage motor 142, and a timing belt 143 as shown in FIG. 1.

The carriage guide shaft 141 is disposed along the X-direction and is fixed at both ends to, for example, a housing of the printer 1. The carriage motor 142 drives the timing belt 143. The timing belt 143 is supported substantially parallel to the carriage guide shaft 141, and a portion of the carriage 13 is fixed to the timing belt 143. When the carriage motor 142 is driven based on a command of the controller 15, the timing belt 143 travels in a forward or reverse direction, and the carriage 13 fixed to the timing belt 143 reciprocates while being guided by the carriage guide shaft 141.

The maintenance module 20 is used in performing the maintenance of later-described nozzle groups 161 (see FIG. 3) included in the printing portion 16. As shown in FIGS. 1 and 3, the maintenance module 20 is provided at a Home position of the printer 1. The printer 1 includes a cap and a suction pump (not shown) for sucking in ink from a nozzle included in a nozzle group 161 after moving the carriage 13 to the Home position for maintenance.

As shown in FIG. 2, the controller 15 is configured to include an I/F 151, a control circuit 152, a memory 153, and a central processing unit (CPU) 154.

The I/F 151 inputs print data input from the external apparatus 30 to the CPU 154.

The control circuit 152 includes circuits that respectively control the supply 11, the conveyor 12, the carriage mover 14, the maintenance module 20, the printing portion 16, and the colorimeter 17. The control circuit 152 controls the operation of each of the foregoing based on a command signal from the CPU 154. The control circuits of the foregoing may be provided separately from the controller 15 and may be connected to the controller 15.

The memory 153 stores various programs for controlling the operation of the printer 1, and various data. Examples of the various data include, for example, print profile data in which the discharge amount of each ink with respect to color data included as print data is stored. Moreover, emission characteristics of later-described light sources 179 with respect to each wavelength, spectral characteristics of a spectroscopic device 173A, and the like may be stored.

The CPU 154 reads and executes the various programs stored in the memory 153 to thereby carry out drive control of the supply 11, the conveyor 12, and the carriage mover 14, print control of the printing portion 16, measurement control of the colorimeter 17, a correction process (e.g., a density unevenness correction process, or a color shift correction process) based on a measurement result of the colorimeter 17, and the like. Specific functions of the CPU 154 will be described later.

Configuration of Carriage

Next, the configuration of the carriage 13, and the configurations of the printing portion 16, the colorimeter 17, and the shutter mechanism 19, which are provided in the carriage 13, will be described.

As shown in FIG. 3, the carriage 13 includes a case in which the printing portion 16, the colorimeter 17, and the shutter mechanism 19 are mounted, and is configured to be movable along the main scanning direction (X-direction) by the carriage mover 14. The printing portion 16 and the colorimeter 17 are connected to the controller 15 through a flexible circuit 130 (see FIG. 1), and are driven based on a control signal from the controller 15.

Although described in detail later, a shutter 192 included in the shutter mechanism 19 is configured to be changeable, in response to the movement of the carriage 13 along the X-direction, between a state of closing a window 176A (see FIG. 4) of the colorimeter 17 and a state of opening the window 176A (a state of allowing light to be incident on the colorimeter 17).

Configuration of Printing Portion

The printing portion 16 performs, based on a command signal from the controller 15, a printing process (an image forming process on the medium M) of forming an image on the medium M by individually discharging inks to a face of the medium M.

As shown in FIG. 3, the printing portion 16 is configured to include the nozzle groups 161 corresponding to the inks of a plurality of colors, ink cartridges (not shown) to supply the inks to the nozzle groups 161, and supply tubes (not shown) to supply the inks from the ink cartridges to the nozzle groups 161.

The nozzle groups 161 are provided respectively corresponding to the colors (e.g., cyan, magenta, yellow, light cyan, light magenta, gray, light gray, matte black, photo black, etc.) to be discharged to the medium M. The nozzle groups 161 are provided with nozzles (not shown) to discharge ink drops. For example, piezo elements are disposed in the nozzles, and by driving the piezo element, an ink drop supplied from an ink tank is discharged to the +Z side and landed on the medium M to form a dot.

Configuration of Colorimeter

Figure 4:
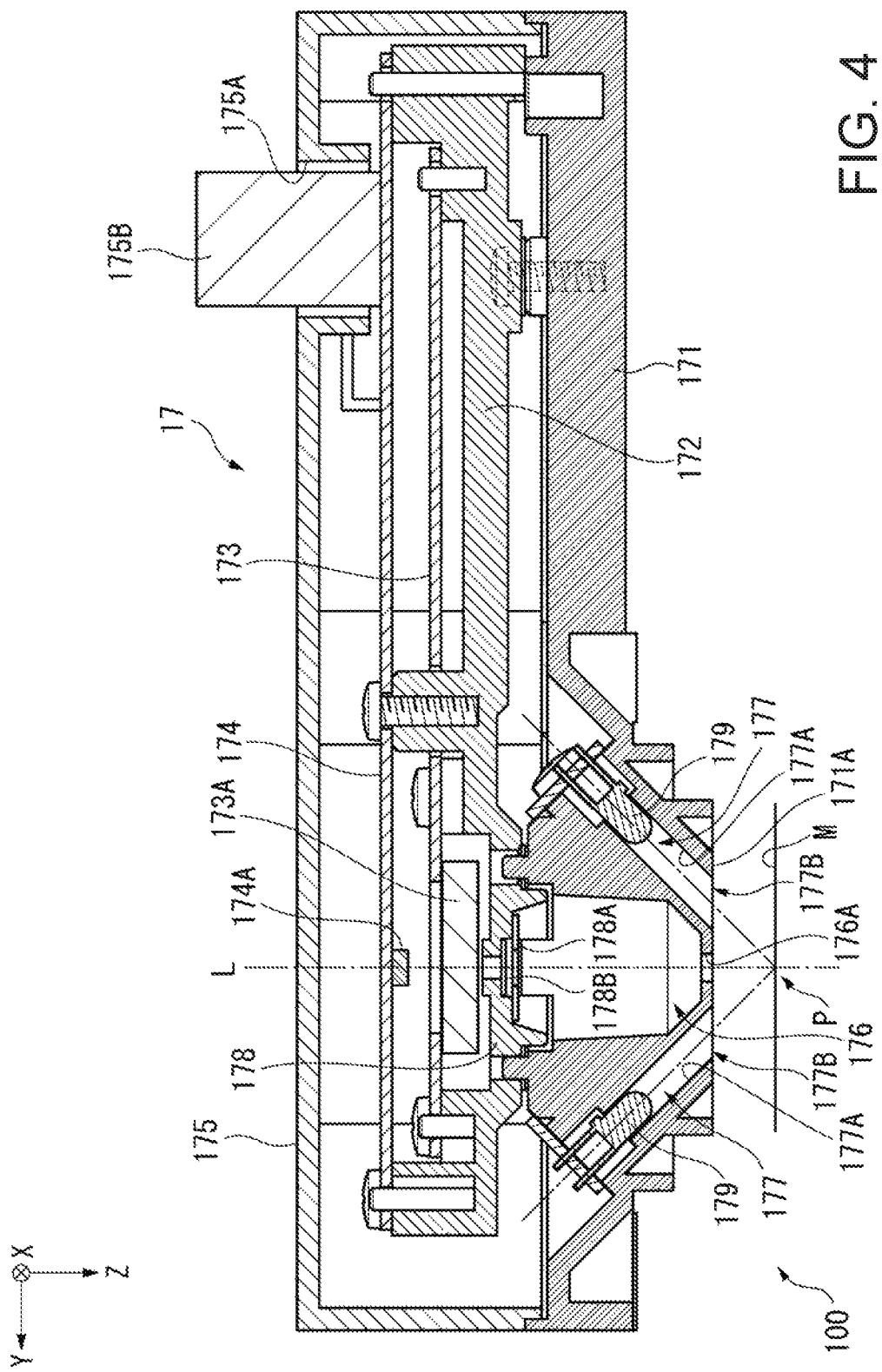
FIG. 4 is a cross-sectional view showing a schematic configuration of a colorimeter according to the first embodiment.

FIG. 4 is a cross-sectional view showing a schematic configuration of the colorimeter 17. FIG. 4 shows the configuration of the colorimeter 17 in a state where the window 176A is opened (a state where the shutter 192 is moved to a position spaced apart from the window 176A (an open position)).

As shown in FIG. 4, the colorimeter 17 includes a base 171, a substrate holder 172 fixed to the base 171, a spectroscopic device holding substrate 173 and a light receiving element holding substrate 174 both of which are held by the substrate holder 172, and a cover 175.

The base 171 includes a measurement light receiver 176 through which light reflected at a measurement position of the medium M passes, and light source positioners 177 where the light sources 179 are disposed.

The measurement light receiver 176 is, for example, a through-hole along the Z-direction, and the window 176A is disposed at an end thereof on the +Z side. Moreover, an optical holder 178 that holds an incident optical system such as, for example, an aperture 178A and an incident lens 178B is fixed to the −Z side of the measurement light receiver 176. The optical axes of the window 176A, the aperture 178A, and the incident lens 178B coincide with the optical axis of the spectroscopic device 173A to be described later or a light receiving element 174A, and constitute a measurement optical axis L. The spectroscopic device 173A and the light receiving element 174A correspond to a measuring portion.

The light source positioner 177 includes, for example, a cylindrical hole 177A that comes closer to the measurement optical axis L as the central axis of the cylindrical hole 177A is closer to the +Z side. The light source 179 is disposed on the −Z side of the cylindrical hole 177A. Examples of the light source 179 can include, for example, an LED. The LED (the light source 179) is fixed to the base 171 by fixing an LED substrate provided with the LED to an end of the cylindrical hole 177A on the −Z side by, for example, threaded engagement. A substrate (an LED substrate, etc.) that holds the light source 179 is connected to a connector 175B to be described later.

An end of the cylindrical hole 177A on the +Z side serves as an illumination window 177B through which light from the light source 179 is emitted. When the shutter 192 is located at the open position, the illumination window 177B is also opened and faces the medium M on the platen 122 as shown in FIG. 4. When the light source 179 emits light in this state, the light from the light source 179 is radiated onto a measurement position P with a predetermined area centered on an intersection point between the medium M and the measurement optical axis L. In the embodiment, spectroscopic measurement is carried out in accordance with a (45°x:0° method in optical geometric conditions defined by the color measurement standard (JIS Z 8722). That is, in the embodiment, illumination light from the light source 179 is caused to be incident at an incident angle of 45°±2° with respect to the measurement position P, and light reflected by a measurement target at 0°±10° in the normal direction is incident on the light receiving element 174A along the measurement optical axis L.

An irregular reflector 171B (see FIG. 7) on the surface of which a plurality of concaves and convexes are formed is formed at least at a portion that faces the shutter 192, when the shutter 192 moves to a closed position where the shutter 192 closes the window 176A, on a base bottom face 171A of the base 171 that faces the medium M (the platen 122).

The irregular reflector 171B is formed by, for example, forming a plurality of concave portions (forming a rough surface) by scraping the base bottom face 171A by a predetermined dimension through an etching process, a blasting process, or the like.

Moreover, it is preferable that at least the portion of the base 171 provided with the irregular reflector 171B has a color (e.g., white having a reflectance of 99% or more with respect to each wavelength) having a high reflectance with respect to each wavelength, such as, for example, white. For example, the base 171 itself may be made of a material of the color, or a white paint may be applied to the base 171.

The substrate holder 172 is fixed to the base 171 by, for example, threaded engagement or the like. The spectroscopic device holding substrate 173 and the light receiving element holding substrate 174 are fixed to the substrate holder 172.

The spectroscopic device holding substrate 173 is a substrate by which the spectroscopic device 173A is held, and includes a through-hole on the optical axis (the measurement optical axis L) of the spectroscopic device 173A. The spectroscopic device holding substrate 173 is fixed to the substrate holder 172 at a position that is located on the −Z side of the optical holder 178 and where the optical axis of the spectroscopic device 173A coincides with the measurement optical axis L. The spectroscopic device 173A is an optical device that transmits light at a specific wavelength from incident light, and examples of the spectroscopic device 173A can include, for example, an etalon element, a liquid crystal tunable filter (LCTF), and an acousto-optic tunable filter (AOTF). The spectroscopic device holding substrate 173 is provided with various circuits that control the spectroscopic device 173A, and the circuits are connected to the connector 175B.

The light receiving element holding substrate 174 is a substrate by which the light receiving element 174A is held. The light receiving element holding substrate 174 is fixed to the substrate holder 172 at a position that is located on the −Z side of the spectroscopic device holding substrate 173 and where the optical axis of the light receiving element 174A coincides with the measurement optical axis L. The light receiving element holding substrate 174 includes various circuits that control the light receiving element 174A, and the circuits are connected to the connector 175B.

As shown in FIG. 4, the cover 175 is fixed to, for example, the outer peripheral edge of the base 171 and forms, together with the base 171, a closed space (dark space) for accommodating the substrate holder 172, the spectroscopic device holding substrate 173, the light receiving element holding substrate 174, and the optical holder 178.

An opening 175A is provided in a portion of the cover 175, and the connector 175B is provided in the opening 175A. The connector 175B is electrically connected with the controller 15 and transmits a control signal from the controller 15 to the light source 179, the spectroscopic device holding substrate 173, or the light receiving element holding substrate 174.

Configuration of Shutter Mechanism

Figure 5:
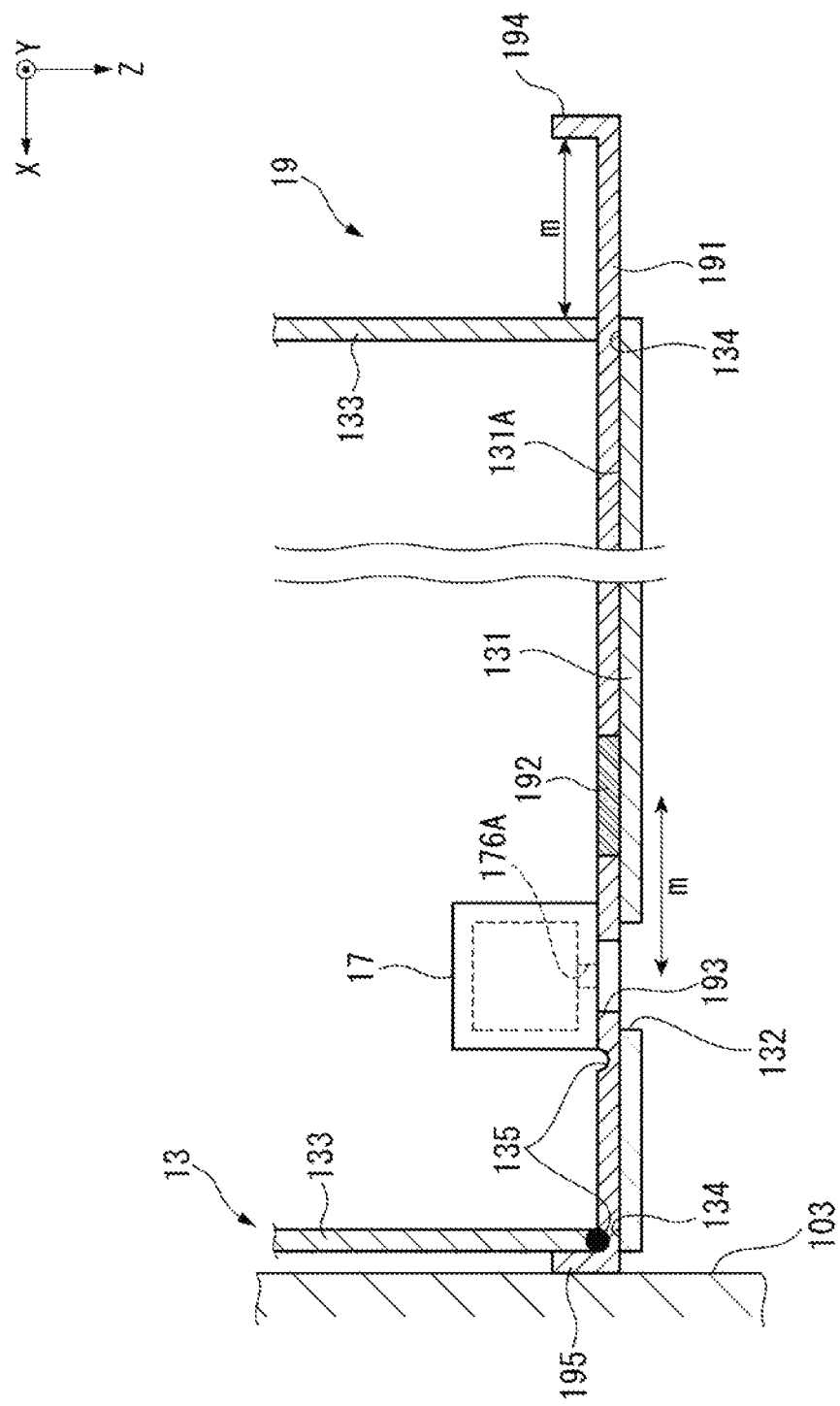
FIG. 5 is a cross-sectional view showing a schematic configuration when a shutter is located at an open position, in a carriage according to the first embodiment.
Figure 6:
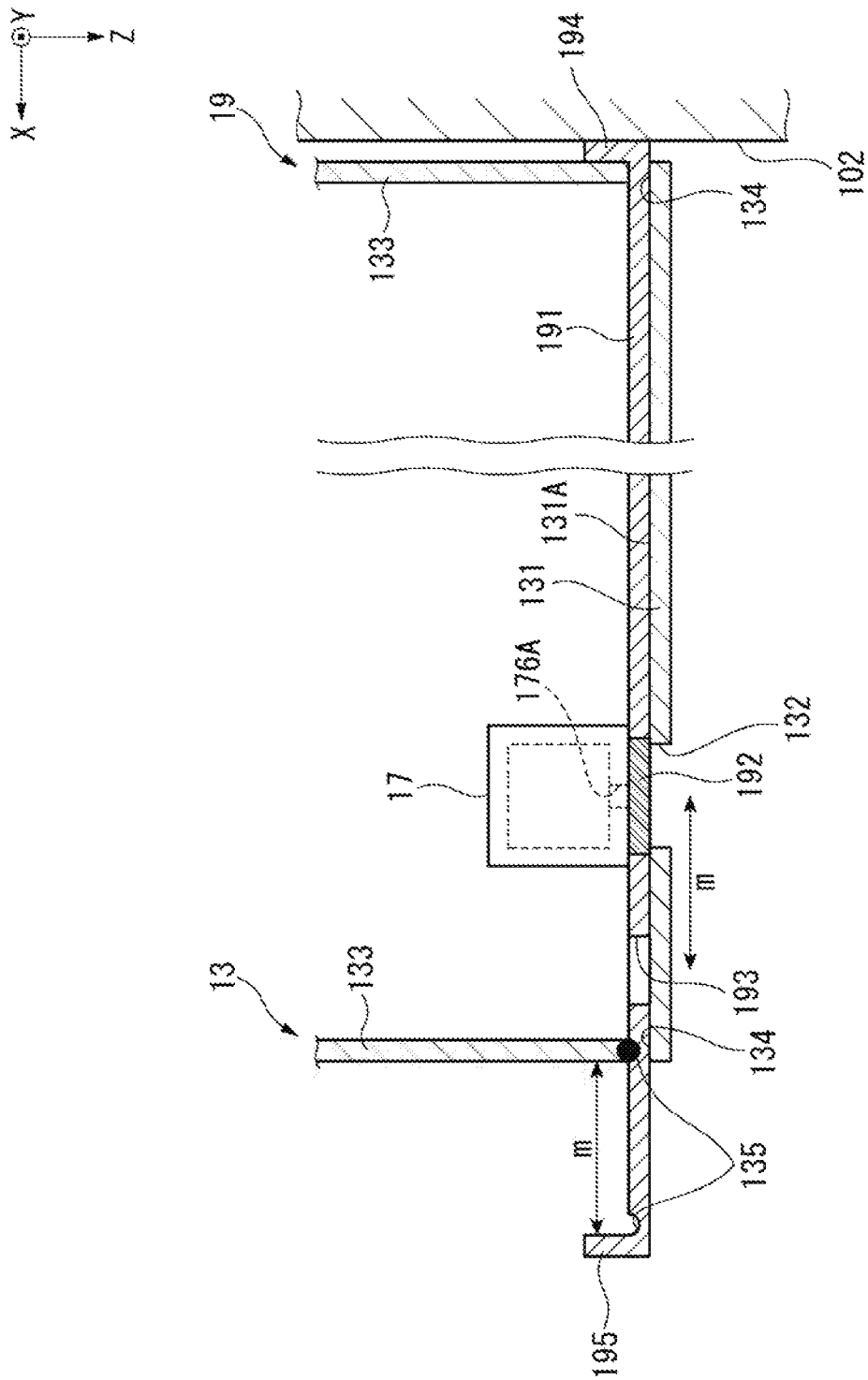
FIG. 6 is a cross-sectional view showing a schematic configuration when the shutter is located at a closed position, in the carriage according to the first embodiment.

FIGS. 5 and 6 are cross-sectional views showing a schematic configuration of the carriage including the shutter mechanism 19. FIG. 5 is a cross-sectional view when the shutter 192 is located at the open position where the shutter 192 opens the window 176A. FIG. 6 is a cross-sectional view when the shutter 192 is located at the closed position where the shutter 192 closes the window 176A.

The shutter mechanism 19 shown in the embodiment includes the carriage 13, a shutter holder 191 including the shutter 192, and the housing 10.

Specifically, as shown in FIGS. 5 and 6, an opening 132 allowing reflected light from the medium M to be incident on the colorimeter 17 is formed at a position overlapping the colorimeter 17 (the window 176A) in the Z-direction, in a bottom plate 131 of the carriage 13. Moreover, an insertion hole 134 through which the shutter holder 191 is inserted is formed in each of side faces 133 of the carriage 13 on the ±X sides. A face of the insertion hole 134 on the +Z side is a flat face parallel to an XY plane, and is flush with an upper face 131A (a face on the −Z side) of the carriage 13 in the bottom plate 131.

Further, a positioning mechanism 135 for positioning the shutter holder 191 is disposed in at least one (in the embodiment, the insertion hole 134 on the +X side) of the insertion holes 134 on the ±X sides. Examples of the positioning mechanism 135 can include, for example, a configuration including a locking projection provided in either one of the insertion hole 134 and the shutter holder 191, and an engaging hole provided in the other and engaging with the locking projection.

As shown in FIGS. 5 and 6, the shutter holder 191 is formed in a flat plate shape elongated in, for example, the X-direction. The shutter 192 is provided in a portion of the shutter holder 191, and a light transmitting portion 193 is provided at a position that is spaced apart by a distance m on the +X side of the shutter 192.

The shutter 192 is a portion that closes the window 176A. A specific configuration of the shutter 192 will be described later.

The light transmitting portion 193 is a portion that transmits reflected light from the measurement position P to the colorimeter 17. The light transmitting portion 193 may be configured of, for example, a through-hole that penetrates the shutter holder 191 in the Z-direction, and a light transmissive optical member such as a glass plate may be fitted in the through-hole.

A lower face (a face on the +Z side) of the shutter holder 191 is slidably placed on the upper face 131A of the bottom plate 131 of the carriage 13, and both ends of the shutter holder 191 are inserted through the insertion holes 134. The shutter holder 191 is disposed to penetrate the carriage 13 in the X-direction.

That is, the end (the first end 194) of the shutter holder 191 on the −X side projects to the −X side through the insertion hole 134 of the carriage 13 on the −X side, and the end (the second end 195) of the shutter 192 on the +X side projects to the +X side through the insertion hole 134 of the carriage 13 on the +X side. The first end 194 and the second end 195 are formed in a flange shape. With this configuration, falling of the shutter holder 191 from the carriage 13 is suppressed.

In the shutter mechanism 19 configured as described above, the window 176A is opened and closed by the shutter 192 with the movement of the carriage 13. Specifically, when the carriage 13 is moved to the end on the +X side (FULL position), the second end 195 abuts on the second sidewall 103 of the housing 10, and as shown in FIG. 5, the shutter holder 191 moves to the −X side by the predetermined distance m with respect to the carriage 13 (open position). This causes the light transmitting portion 193 to face the window 176A, and the reflected light from the measurement position P can be incident on the colorimeter 17.

On the other hand, when the carriage 13 is moved to the end portion on the −X side (HOME position), the first end 194 abuts on the first sidewall 102 of the housing 10, and as shown in FIG. 6, the shutter holder 191 moves to the +X side by the predetermined distance m with respect to the carriage 13 (closed position). This causes the shutter 192 to face the window 176A, and the window 176A is closed by the shutter 192.

Next, a specific configuration of the shutter 192 according to the embodiment will be described.

Figure 7:
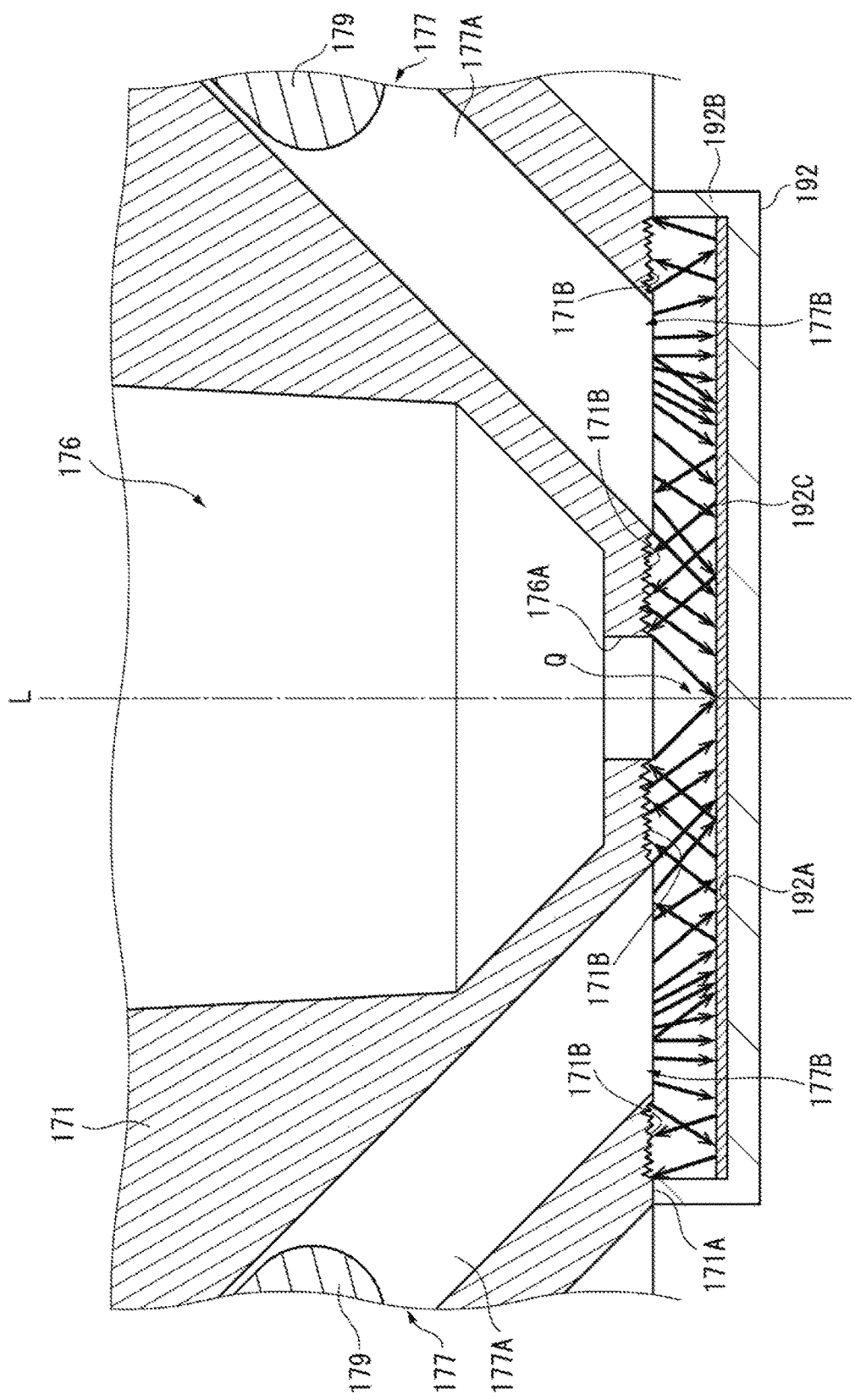
FIG. 7 is a cross-sectional view showing a schematic configuration in the vicinity of the shutter when the shutter is located at the closed position, in an optical module according to the first embodiment.

FIG. 7 is a cross-sectional view showing a schematic configuration of the optical module 100 in the vicinity of the shutter 192 when the shutter 192 is moved to the closed position.

As shown in FIG. 7, the shutter 192 includes a shutter face 192A facing the base 171, and a frame 192B upstanding from the outer peripheral edge of the shutter face 192A.

The shutter face 192A is a planar surface that is substantially parallel to the XY plane substantially parallel to the platen 122 (the medium M). The position of the shutter face 192A may be such that the shutter face 192A is flush with the upper face (a face facing the colorimeter 17) of the shutter holder 191 or is different from the upper face of the shutter holder 191.

Moreover, the shutter face 192A is located to face the window 176A and the illumination windows 177B of the base 171 when the shutter 192 is located at the closed position.

A white reference plate 192C for measuring a reference value in a colorimetric process is provided on the shutter face 192A. In the embodiment, the white reference plate 192C is provided over the entire face of the shutter face 192A. In the white reference plate 192C, a region that is a predetermined area centered on an intersection point between the measurement optical axis L and the white reference plate 192C and faces the window 176A serves as a reference measurement position Q to be measured by the colorimeter 17.

The frame 192B is provided along the outer peripheral edge of the shutter face 192A. Here, the window 176A and the illumination windows 177B are located in a region that is surrounded by the frame 192B when the shutter 192 is located at the closed position.

An end face of the frame 192B on the −Z side is in contact with the base 171. Therefore, the shutter face 192A closes the window 176A at a position spaced apart from the base 171 by an amount corresponding to the projection dimension of the frame 192B.

As described above, the base 171 is provided with the irregular reflector 171B including the plurality of concaves and convexes, and the tips of the convex portions of the irregular reflector 171B are flush with the base bottom face 171A of the base 171. Therefore, interference of the frame 192B with the convex portions of the irregular reflector 171B is suppressed at the time of movement of the shutter 192.

In the configuration described above, the entry of a foreign matter such as an ink mist into the interior (a space surrounded by the shutter face 192A, the frame 192B, and the base 171) of the shutter 192 is suppressed. Moreover, the interior of the shutter 192 is a dark space, so that measurement with suppressed influence of external light can be carried out. For example, the measurement of a dark voltage or the like can be accurately performed.

In the embodiment, a configuration in which the frame 192B abuts on the base 171 is shown; however, a gap having a predetermined dimension may be provided between the frame 192B and the base 171. By setting the gap to a dimension equal to or less than an average diameter dimension of a foreign matter such as an ink mist, the entry of the foreign matter can be suppressed.

Light Guide to White Reference Plate at Closed Position

When a reference value is measured using the white reference plate 192C, it is preferable that a measurement environment in measuring the measurement position P is substantially the same as a measurement environment in measuring the white reference plate 192C.

That is, when the shutter 192 is located at the open position as shown in FIG. 4 and measurement is carried out on the measurement position P, light from the light source 179 is diffusely emitted through the illumination window 177B with the optical axis of the light source 179 as a center, and a partial light of the emitted light that is along the optical axis reaches the measurement position P. Hence, it is preferable that the same amount of light as the amount of light radiated onto the measurement position P at the time of measuring the measurement position P is radiated onto the reference measurement position Q of the white reference plate 192C in the measurement of the white reference plate 192C.

However, in a configuration in which the white reference plate 192C is disposed on the shutter face 192A of the shutter 192, the white reference plate 192C is located closer to the colorimeter 17 side than the measurement position P. Therefore, in a configuration in which the white reference plate 192C is simply provided on the shutter 192 closing the window 176A, the amount of illumination light reaching the white reference plate 192C is small, and the measurement accuracy of the white reference plate 192C is reduced.

In contrast, in the embodiment, the irregular reflector 171B provided on the base bottom face 171A of the base 171 constitutes a light guide, and increases the amount of light radiated onto the reference measurement position Q.

Specifically, as shown in FIG. 7, the base bottom face 171A of the base 171 is provided with the irregular reflectors 171B on a face that faces the shutter face 192A when the shutter 192 is located at the closed position. In the embodiment, the shutter face 192A covers a region on the outside (the side opposite to the window 176A) of the illumination window 177B when located at the closed position. Hence, the irregular reflector 171B is not only provided on the base bottom face 171A between the window 176A and the illumination window 177B, but also on the base bottom face 171A on the side of the illumination window 177B opposite to the window 176A.

It is sufficient that the irregular reflector 171B is provided in a region other than the region facing the reference measurement position Q centered on the measurement optical axis L. For example, a configuration may be employed, in which the irregular reflector 171B is also provided at a position facing the shutter face 192A, in the cylindrical hole 177A of the light source positioner 177.

A portion of light (illumination light) emitted through the illumination window 177B and then diffused is radiated onto a position (the reference measurement position Q) of the white reference plate 192C that faces the window 176A, while the remainder of the light is radiated onto the white reference plate 192C other than the reference measurement position Q. Here, in the embodiment, the amount of light directly radiated through the illumination window 177B onto the reference measurement position Q is small. However, the white reference plate 192C has reflection characteristics such that a light reflectance with respect to each wavelength exceeds, for example, 99%. Hence, the light radiated onto a portion of the white reference plate 192C other than the reference measurement position Q is reflected by the white reference plate 192C and travels to the base 171 side. In the reflected light, light that reaches the irregular reflector 171B of the base 171 is irregularly reflected by the irregular reflector 171B, and thus the light is diffused in various directions. Regular reflection at the white reference plate 192C and irregular reflection at the irregular reflector 171B described above are repeated, so that the amount of light is made uniform between the base 171 and the white reference plate 192C (the shutter face 192A). As a result, uniform light is radiated onto the reference measurement position Q of the white reference plate 192C.

In this case, the amount of illumination light reaching the reference measurement position Q is increased compared to, for example, the case where the irregular reflector 171B, which is the light guide, is not provided. With this configuration, the measurement of the white reference plate 192C can be accurately performed in the colorimeter 17.

Functional Configuration of CPU

Figure 8:
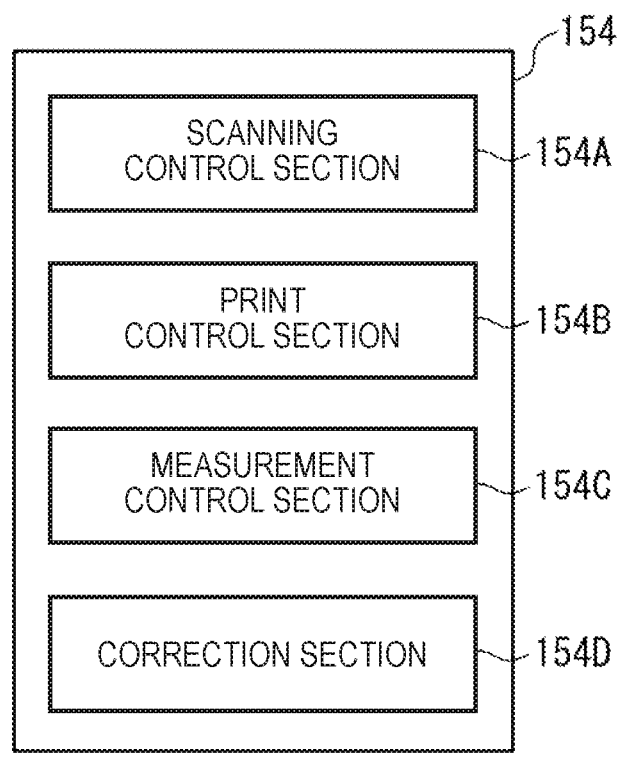
FIG. 8 is a block diagram showing a functional configuration of a CPU of the printer according to the first embodiment.

FIG. 8 is a block diagram showing a functional configuration of the CPU 154.

The CPU 154 reads and executes the various programs stored in the memory 153 to thereby function as a scanning control section 154A, a print control section 154B, a measurement control section 154C, and a correction section 154D as shown in FIG. 8.

The scanning control section 154A outputs a command signal to drive the supply 11, the conveyor 12, and the carriage mover 14 to the control circuit 152. With this configuration, the control circuit 152 causes the roll drive motor of the supply 11 to be driven to supply the medium M to the conveyor 12. Moreover, the control circuit 152 causes the conveying motor of the conveyor 12 to be driven to convey a predetermined region of the medium M to a position of the platen 122 that faces the carriage 13 along the Y-direction. Moreover, the control circuit 152 causes the carriage motor 142 of the carriage mover 14 to be driven to move the carriage 13 along the X-direction.

The scanning control section 154A outputs, in changing the position of the shutter 192, a command signal to drive the carriage mover 14 to the control circuit 152. With this configuration, the control circuit 152 causes the carriage 13 to move to Home when moving the shutter 192 to the closed position, and causes the carriage 13 to move to Full when moving the shutter 192 to the open position.

The print control section 154B corresponds to a print controller, and outputs a print command signal to drive control the supply 11, the conveyor 12, the carriage mover 14, and the printing portion 16 to the control circuit 152 based on, for example, print data input from the external apparatus 30. The control circuit 152 outputs a print control signal to the printing portion 16, and causes the piezo elements provided in the nozzles to be driven to discharge ink to the medium M.

The measurement control section 154C outputs a measurement command signal to drive the colorimeter 17 to the control circuit 152, and causes the colorimeter 17 to carry out a measuring process to obtain the reflectance of each wavelength at the measurement position P.

Moreover, the measurement control section 154C measures the reflectance of the medium M with respect to light at each wavelength from a result of measurement on the medium M using a measurement result of the white reference plate 192C as a reference value.

Specifically, the measurement control section 154C obtains, as a reference value W, a measurement result (measurement result of a received amount with respect to light at each wavelength) from the colorimeter 17 when the shutter 192 is moved to the closed position and the light source 179 is turned on, from the colorimeter 17.

Moreover, the measurement control section 154C obtains, as a dark voltage value D, a measurement result from the colorimeter 17 when the shutter 192 is moved to the closed position and the light source 179 is turned off, from the colorimeter 17.

Further, the measurement control section 154C obtains, as a measured value S of the medium M, a measurement result from the colorimeter 17 when the shutter 192 is moved to the closed position and the light source 179 is turned off.

After this, the measurement control section 154C calculates, using the measured value S, the reference value W, and the dark voltage value D, a reflectance x of each wavelength at the measurement position P of the medium M from, for example, $x=(S-D)/W$.

The correction section 154D carries out various correction processes based on the reflectance with respect to each wavelength obtained by the colorimeter 17. Examples of the correction processes include, for example, a density unevenness or color shift correction.

Operation of Printer

Next, as one example of the operation of the printer 1 according to the embodiment, a color shift correction process will be described based on the drawing.

Figure 9:
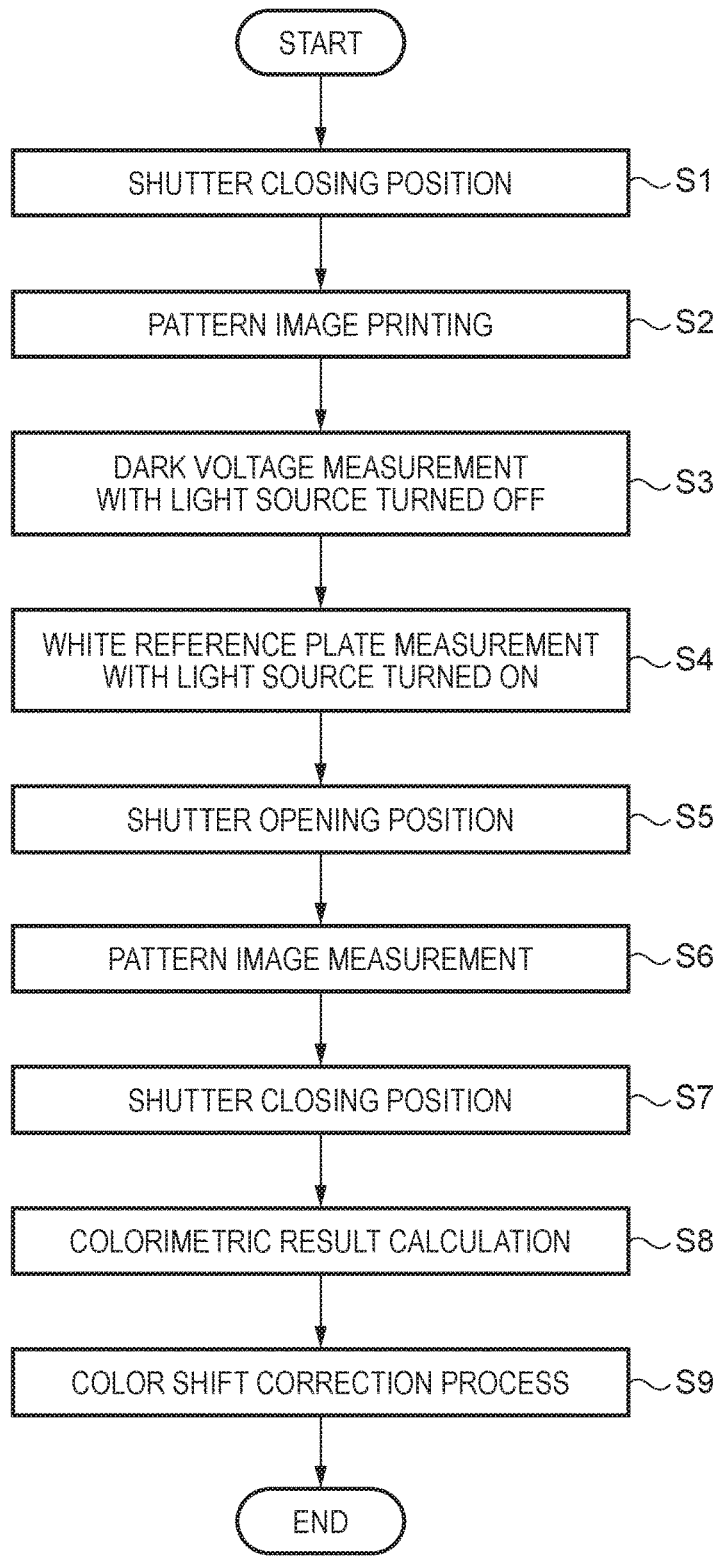
FIG. 9 is a flowchart showing one example of a correction process in the printer according to the first embodiment.

FIG. 9 is a flowchart showing one example of the correction process in the printer 1.

The color shift correction process performed by the printer 1 according to the embodiment is carried out, for example, when power is turned on or an instruction to execute the correction process is received. The printer 1 moves the shutter 192 to the open position at the time of carrying out regular measurement such as a measuring process on the medium M; while, in other cases such as, for example, at the time of standby, at the time of measuring the white reference plate 192C, or at the time of an image printing process, the printer 1 moves the shutter 192 to the closed position.

In the correction process shown in FIG. 9, first, the scanning control section 154A causes the carriage 13 to move to HOME, and causes the shutter 192 to move to the closed position (Step S1).

After this, the print control section 154B prints a pattern image for color shift correction on the medium M (Step S2). Examples of the pattern image for color shift correction can include, for example, a color chart in which a plurality of color patches different in color from each other are disposed along the X-direction and the Y-direction.

On this occasion, the shutter 192 is located at the closed position, and therefore, the entry of a foreign matter such as an ink mist into the colorimeter 17 at the time of printing is suppressed.

Next, the measurement control section 154C measures the dark voltage value by detecting an output (i.e., a dark voltage) of the light receiving element 174A while turning off the light source 179 of the colorimeter 17 (Step S3).

On this occasion, when an output value from the light receiving element 174A exceeds a predetermined value, there is a possibility that the window 176A is not closed by the shutter 192. Hence, when an output value equal to or greater than the predetermined value is detected, the scanning control section 154A may cause the carriage 13 to move to the Home position and cause the shutter 192 to move to the closed position. With this configuration, even when the shutter 192 moves from the closed position at the time of movement of the carriage 13, the movement of the shutter 192 can be detected, and thus the shutter 192 can be moved to the closed position.

Next, the measurement control section 154C causes the colorimeter 17 to be driven to perform spectroscopic measurement of the white reference plate 192C (Step S4). That is, the measurement control section 154C causes the light source 179 to be turned on to illuminate the white reference plate 192C, and obtains reference values with respect to a plurality of measurement wavelengths with respect to reflected light from the white reference plate 192C.

On this occasion, when the light source 179 is turned on, the illumination light is diffused by the irregular reflector 171B, which is the light guide, and the amount of light radiated onto the reference measurement position Q of the white reference plate 192C is increased.

An output voltage (light source voltage) to the light source 179 may be appropriately adjusted.

For example, when the shutter 192 is moved to the open position, a first reference value obtained by measuring the white reference plate 192C disposed at the measurement position P is previously measured. Moreover, a second reference value of the white reference plate 192C when the shutter 192 is moved to the closed position is obtained while changing the light source voltage to the light source 179. Then, the light source voltage at which a difference between the first reference value and the second reference value is equal to or less than a predetermined allowable value is obtained, and the light source voltage is stored in the memory 153 as a light source voltage to the light source 179 used in measuring the white reference plate 192C. The setting of the light source voltage may be previously carried out at the time of manufacture of the printer 1 in, for example, a factory or the like, or may be carried out by a user at any timing.

After this, the scanning control section 154A causes the carriage 13 to move to Full, and causes the shutter 192 to move to the open position (Step S5).

Then, the measurement control section 154C causes the colorimeter 17 to be driven to perform a spectroscopic measurement process on the pattern image (each color patch), and obtains measured values (Step S6).

After the spectroscopic measurement process in Step S6 ends, the scanning control section 154A causes the carriage 13 to move to the Home position and causes the shutter 192 to move to the closed position (Step S7).

Next, the measurement control section 154C calculates, based on the obtained reference value, dark voltage value, and measured value, a colorimetric result (reflectance data with respect to each wavelength) with respect to each color patch (Step S8).

Then, the correction section 154D performs the color shift correction process based on the colorimetric result obtained through Step S8 (Step S9). For example, the correction section 154D calculates a difference value between the colorimetric result with respect to each color patch and the reflectance reference value of each color patch with respect to each wavelength. Then, when the difference value exceeds a predetermined threshold, the correction section 154D calculates a correction value in response to the difference value and updates the print profile data stored in the memory 153.

Operational Effects of First Embodiment

The printer 1 according to the embodiment includes the colorimeter 17 mounted in the carriage 13 movable in the X-direction, and the shutter mechanism 19 including the shutter 192 capable of closing the window 176A provided in the base 171 of the colorimeter 17. The shutter 192 is provided with the white reference plate 192C on the shutter face 192A facing the base 171, and the white reference plate 192C is disposed closer to the colorimeter 17 side than the measurement position P when the shutter 192 moves to the closed position. In addition, in the embodiment, the irregular reflector 171B is provided at a position of the base 171 facing the shutter face 192A, and by irregularly reflecting light from the light source 179 with the irregular reflector 171B, the light from the light source 179 is guided to the reference measurement position Q of the white reference plate 192C.

In the configuration described above, the window 176A is closed by the shutter 192, so that the entry of a foreign matter from the window 176A into the interior of the colorimeter 17 can be suppressed. Therefore, the deterioration of the colorimeter 17 due to the adhesion of an ink mist or the like to each member of the colorimeter can be suppressed, and thus a reduction in the measurement accuracy of the colorimeter 17 can be suppressed. Moreover, the white reference plate 192C is provided on the shutter 192, and therefore, it is unnecessary to separately provide the white reference plate 192C on, for example, the platen 122 or the like. Further, the white reference plate 192C is provided on the shutter face 192A of the shutter 192, and therefore, the adhesion of a foreign matter to the white reference plate 192C can also be suppressed.

In addition, in the embodiment, the white reference plate 192C is located closer to the colorimeter 17 side than the measurement position P, but light from the light source 179 is irregularly reflected by the irregular reflector 171B, which is the light guide, and is radiated onto the reference measurement position Q of the white reference plate 192C. For this reason, the amount of light radiated onto the reference measurement position Q is increased, which makes it possible to carry out highly accurate measurement on the white reference plate 192C and thus obtain a highly accurate reference value.

Hence, the measurement control section 154C can accurately calculate a reflectance with respect to the medium M based on the highly accurate reference value.

In the embodiment, the irregular reflector 171B is provided at the position facing the shutter 192, when the shutter 192 moves to the closed position, on the base bottom face 171A of the base 171. For this reason, the light from the light source 179 can be irregularly reflected more than once between the white reference plate 192C and the irregular reflector 171B, and thus the amount of light reaching the reference measurement position Q can be increased.

Moreover, the illumination light repeats irregular reflection between the shutter 192 and the base 171, so that the amount of the light reaching the reference measurement position Q is made uniform. Therefore, for example, in the case where the light receiving element 174A includes a plurality of pixels and a spectral image is obtained by the colorimeter 17, the occurrence of illumination unevenness can be suppressed, and thus a proper reference value can be measured.

Second Embodiment

Next, a second embodiment will be described.

In the first embodiment, the irregular reflector 171B provided on the base 171 has been exemplified as the light guide. In the second embodiment, however, a member constituting the light guide is different from that of the first embodiment.

Figure 10:
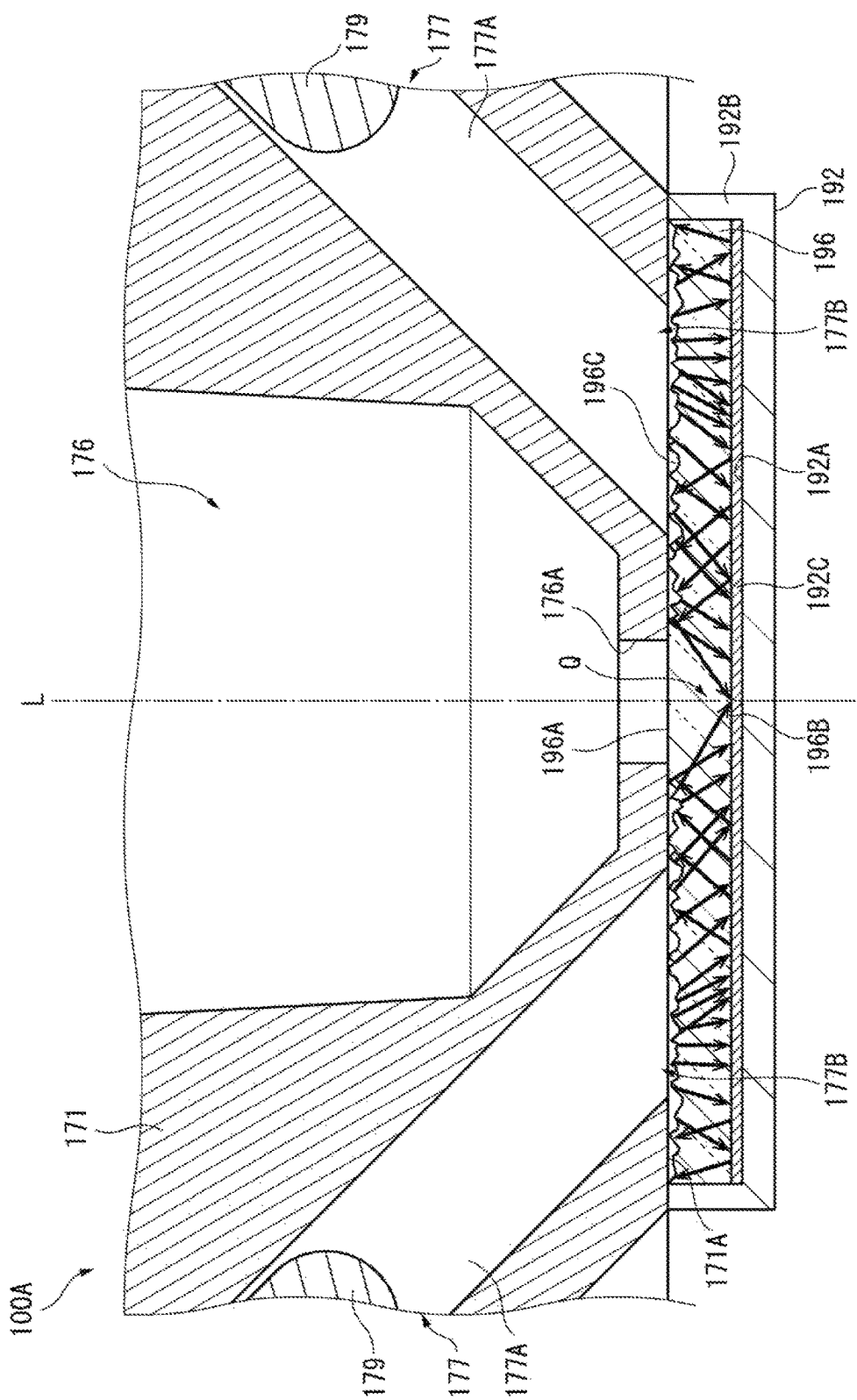
FIG. 10 is a cross-sectional view showing a schematic configuration in the vicinity of the shutter when the shutter is located at the closed position, in an optical module according to a second embodiment.

FIG. 10 is a cross-sectional view showing a schematic configuration of an optical module 100A in the vicinity of the shutter 192 when the shutter 192 is moved to the closed position in the second embodiment. In the following description, the configurations already described are denoted by the same reference numerals and signs, and a description of those configurations is omitted or simplified.

In the second embodiment, as shown in FIG. 10, the irregular reflector 171B is not provided in the same manner on the base bottom face 171A of the base 171 as in the first embodiment.

Rather, in the second embodiment, the shutter 192 is provided with a light transmissive plate 196, which is a light transmissive member, in a space surrounded by the shutter face 192A (the white reference plate 192C) and the frame 192B.

As shown in FIG. 10, the light transmissive plate 196 is provided to cover the window 176A and the illumination windows 177B of the base 171. That is, the light transmissive plate 196 covers an area centered on the window 176A of the base 171 and up to a predetermined region on the outside (the side opposite to the window 176A) of the illumination window 177B.

The light transmissive plate 196 includes a first face 196A facing the colorimeter 17, and a second face 196B that is a face on the side opposite to the first face 196A and faces the shutter face 192A (the white reference plate 192C). The light transmissive plate 196 is provided with an irregular reflector 196C in a region of the first face 196A other than a position overlapping the reference measurement position Q in a plan view as viewed from the measurement optical axis L. The irregular reflector 196C constitutes the light guide.

The second face 196B of the light transmissive plate 196 is closely attached to the white reference plate 192C. With this configuration, interference fringes that might occur due to a gap between the light transmissive plate 196 and the white reference plate 192C is suppressed.

In the optical module 100A described above, light emitted from the light source 179 is incident on the light transmissive plate 196 through the illumination window 177B. The irregular reflector 196C is provided on the first face 196A of the light transmissive plate 196 facing the illumination window 177B, and therefore, the light from the light source 179 is scattered by the irregular reflector 196C when incident on the light transmissive plate 196 through the illumination window 177B, and is scattered in the light transmissive plate 196. The light incident on the light transmissive plate 196 is reflected by the white reference plate 192C similarly to the first embodiment, and is irregularly reflected by the irregular reflector 196C provided on the first face 196A, so that the light is further diffused in the light transmissive plate 196. The irregular reflection described above is repeated, so that the light from the light source 179 is made uniform in the light transmissive plate 196 and reaches the reference measurement position Q of the white reference plate 192C.

Therefore, similarly to the first embodiment, the amount of light radiated onto the reference measurement position Q is also increased in the embodiment, which makes it possible to carry out highly accurate measurement on the white reference plate 192C and thus obtain a highly accurate reference value.

The light transmissive plate 196 is provided to cover the illumination windows 177B.

When the light transmissive plate 196 covers only a portion of the illumination window 177B, light emitted through a portion that is not covered by the light transmissive plate 196 escapes to the outside of the light transmissive plate 196, and the amount of light radiated onto the reference measurement position Q is reduced. In contrast, in the embodiment, in the light emitted through the illumination window 177B, light that is not incident on the light transmissive plate 196 is reduced, and the amount of light radiated onto the reference measurement position Q can be increased.

Further, the irregular reflector 196C is also provided at the position facing the illumination window 177B, on the first face 196A of the light transmissive plate 196. With this configuration, the light reflected at the white reference plate 192C is also irregularly reflected at the irregular reflector 196C facing the illumination window 177B, and thus the amount of light passing from the illumination window 177B through the cylindrical hole 177A can be reduced.

Third Embodiment

In the first embodiment and the second embodiment, an example in which the light from the light source 179 is guided to the reference measurement position Q of the white reference plate 192C by irregularly reflecting the light has been shown as the light guide. In contrast, a third embodiment differs from the embodiments in that the light guide refracts the light from the light source 179 toward the reference measurement position Q.

Figure 11:
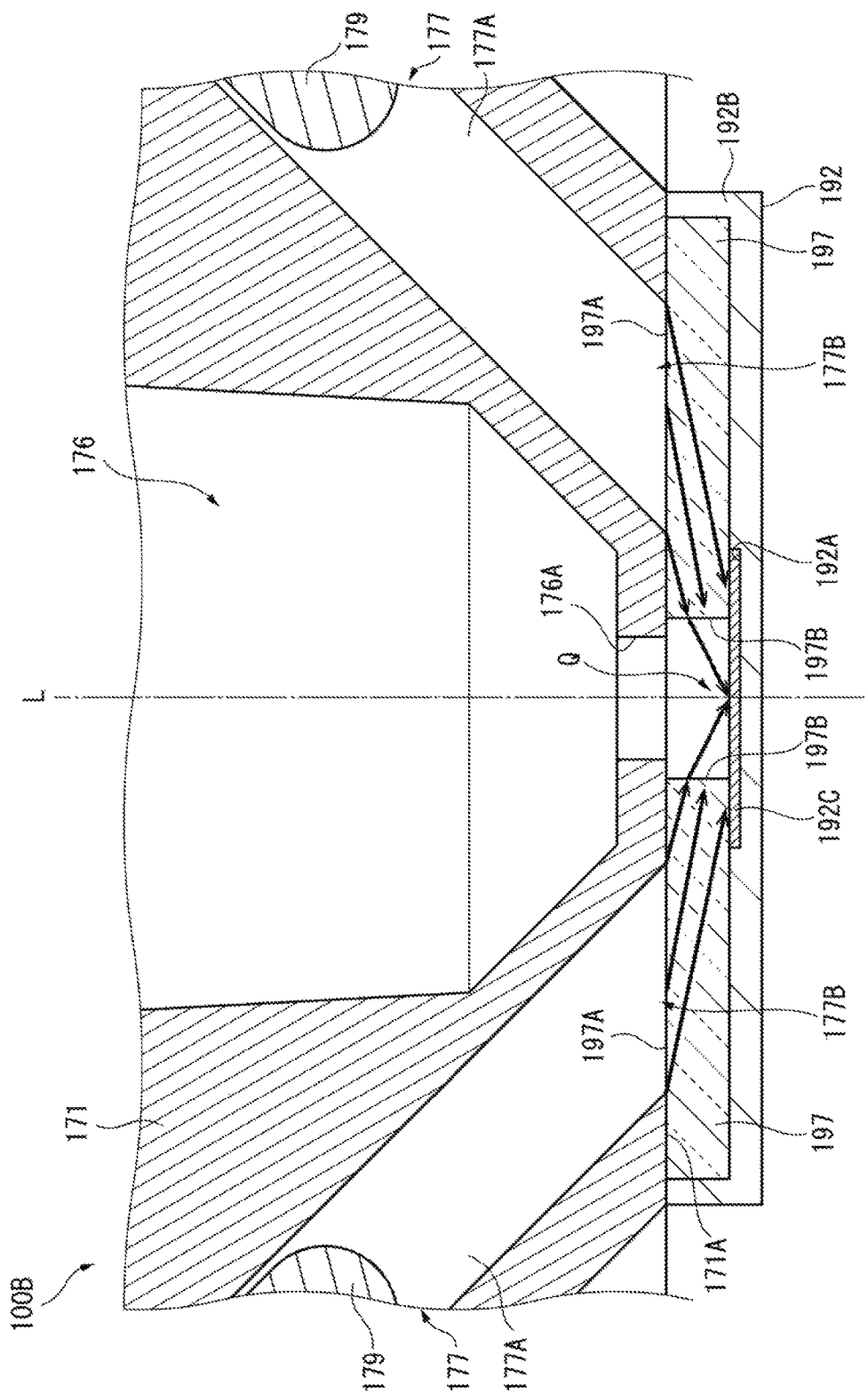
FIG. 11 is a cross-sectional view showing a schematic configuration in the vicinity of the shutter when the shutter is located at the closed position, in an optical module according to a third embodiment.

FIG. 11 is a cross-sectional view showing a schematic configuration of an optical module 100B in the vicinity of the shutter 192 when the shutter 192 is moved to the closed position in the third embodiment.

In the optical module 100B according to the third embodiment, the shutter 192 is provided with prisms 197 in a space surrounded by the shutter face 192A, the white reference plate 192C, and the frame 192B.

In the embodiment, the light from the light source 179 is refracted by the prisms 197 toward the reference measurement position Q, and therefore, it is unnecessary to reflect the light at the white reference plate 192C. Therefore, in the embodiment, as shown in FIG. 11, the white reference plate 192C is provided at a position (a position facing the window 176A) corresponding to the reference measurement position Q, on the shutter face 192A. The white reference plate 192C may be provided over the entire shutter face 192A similarly to the first embodiment or the second embodiment.

The prisms 197 are respectively provided for the illumination windows 177B and disposed to cover the illumination windows 177B. The prism 197 is not provided on the reference measurement position Q (at a position facing the window 176A). That is, the prism 197 includes a first face 197A facing the illumination window 177B to cover the illumination window 177B, and a third face 197B facing a space along the measurement optical axis L from the reference measurement position Q of the white reference plate 192C to the window 176A.

Figure 12:
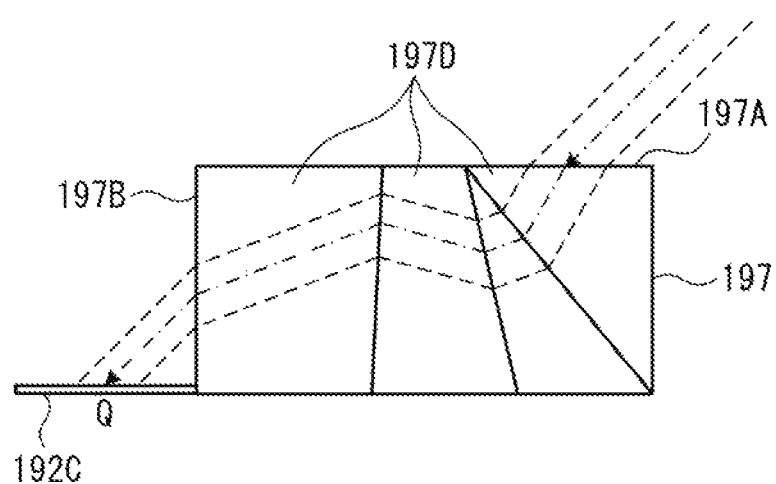
FIG. 12 is a schematic view showing an optical path of light emitted from a light source, in a prism according to the third embodiment.

FIG. 12 is a schematic view showing an optical path of light emitted from the light source 179 in the prism 197.

As shown in FIG. 12, the prisms 197 are each configured of a plurality of optical layers 197D having different refractive indexes. For this reason, as shown in FIG. 12, light is refracted at an angle in accordance with a refractive index ratio at an interface between the optical layers 197D adjacent to each other.

With this configuration, as shown in FIG. 11, the light emitted from the light source 179 and then incident on the first face 197A facing the illumination window 177B is changed in its traveling direction in the prism 197, and emitted at, for example, an angle (45°) in accordance with the color measurement standard (JIS Z 8722) from the third face 197B toward the reference measurement position Q.

The prism 197 shown in FIG. 12 is one example for guiding the light from the light source 179 to the reference measurement position Q, and the prism 197 is not limited to this example. The refraction direction may be controlled by more optical layers 197D. Moreover, an example in which the third face 197B is vertical to the shutter face 192A is shown, but, for example, the third face 197B may be inclined with respect to the shutter face 192A.

In the optical module 100B according to the embodiment, the light emitted from the light source 179 is refracted by the prism 197 and guided to the reference measurement position Q. Hence, similarly to the first embodiment or the second embodiment, the amount of light radiated onto the reference measurement position Q is increased, so that colorimetric accuracy of the white reference plate 192C can be improved.

Moreover, light can be radiated at a desired angle (e.g., the angle in accordance with the color measurement standard) onto the reference measurement position Q, and the measurement of the reference measurement position Q can be carried out under the same measurement conditions as those when the measurement of the measurement position P is carried out by the colorimeter 17.

MODIFIED EXAMPLES

The invention is not limited to the embodiments described above, and modifications, improvements, and the like within a range capable of achieving the advantage of the invention are included in the scope of the invention.

Modified Example 1

For example, an example has been shown in the first embodiment, in which the irregular reflector 171B is provided at the position facing the shutter face 192A, on the base bottom face 171A of the base 171. However, the invention is not limited to this example. For example, the irregular reflector, which is the light guide, may be provided also on the shutter 192 side.

In this case, for example, the white reference plate 192C is provided only in a region facing the window 176A similarly to the third embodiment, and the irregular reflector is formed on the shutter face 192A. Alternatively, the irregular reflector may be formed in a region other than the reference measurement position Q of the white reference plate 192C.

Modified Example 2

A configuration has been exemplified in the second embodiment, in which the irregular reflector 196C is provided only on the first face 196A of the light transmissive plate 196. However, the invention is not limited to this configuration.

Figure 13:
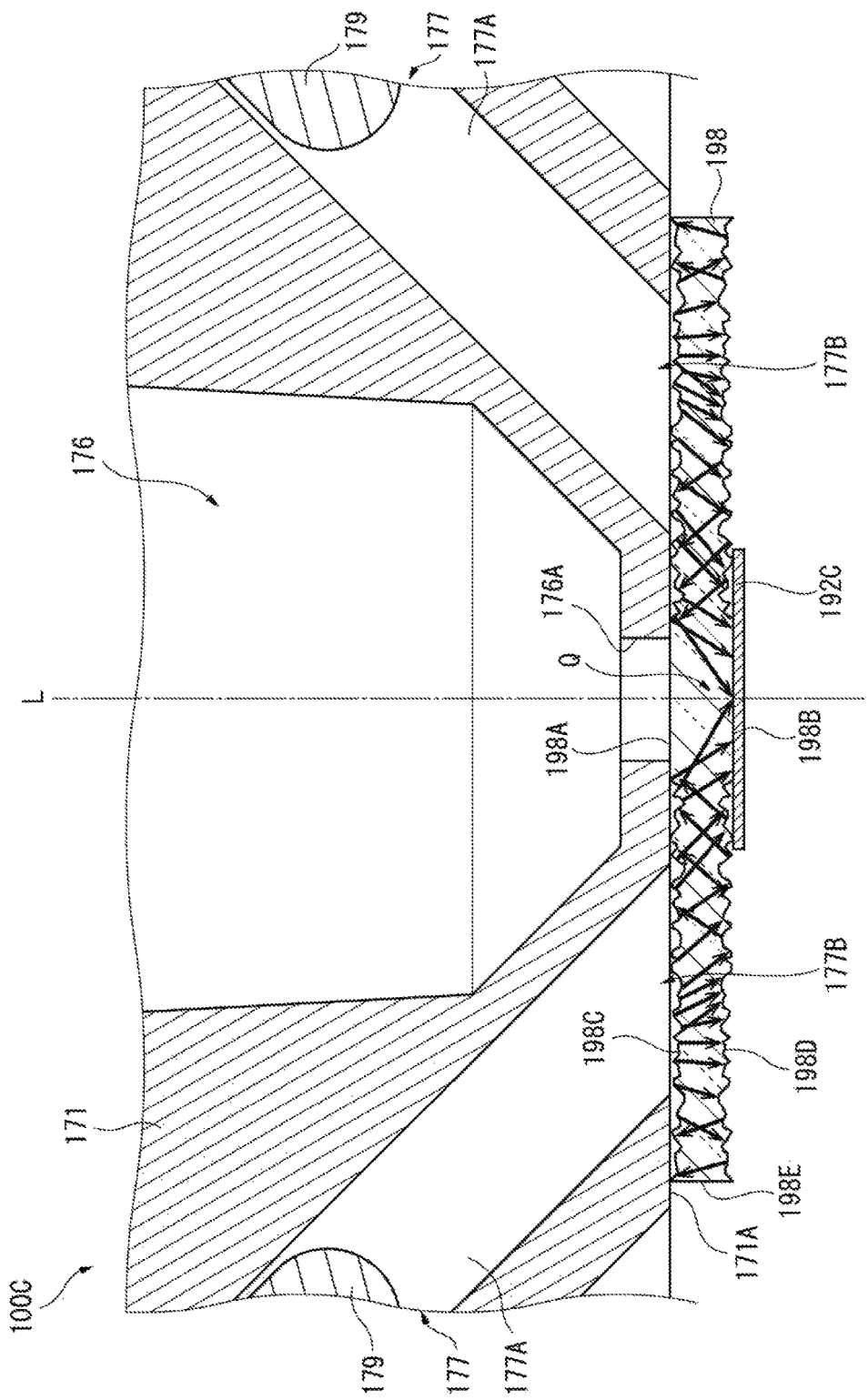
FIG. 13 is a cross-sectional view showing a schematic configuration in the vicinity of the shutter when the shutter is located at the closed position, in an optical module according to Modified Example 2.

FIG. 13 is a cross-sectional view showing a schematic configuration in the vicinity of the shutter 192 when the shutter 192 is moved to the closed position, in an optical module 100C according to Modified Example 2.

In the optical module 100C, a light transmissive plate 198 is provided similarly to the second embodiment.

In the optical module 100C shown in FIG. 13, the light transmissive plate 198 and the white reference plate 192C constitute a shutter that closes the window 176A. The shutter can be configured by, for example, forming a through-hole in the shutter holder 191 and fixing (e.g., fitting) the light transmissive plate 198 to which the white reference plate 192C is fixed in the through-hole.

Moreover, in the optical module 100C shown in FIG. 13, the white reference plate 192C is provided only at a position facing the window 176A similarly to the third embodiment, and the light transmissive plate 198 is closely attached and fixed to the white reference plate 192C.

In the light transmissive plate 198, irregular reflectors 198C and 198D are provided in regions other than a position overlapping the reference measurement position Q in a plan view as viewed from the measurement optical axis L, on a first face 198A facing the base 171 and a second face 198B on the side opposite to the first face 198A.

Moreover, a configuration may be employed, in which the irregular reflector is also provided on a side face 198E of the light transmissive plate 198 that crosses the first face 198A and the second face 198B.

In the optical module 100C configured as described above, light incident from the light source 179 is irregularly reflected between the irregular reflector 198C on the first face 198A side of the light transmissive plate 198 and the irregular reflector 198D on the second face 198B side. With this configuration, similarly to the second embodiment, the light is made uniform in the light transmissive plate 198, and the amount of light radiated onto the reference measurement position Q is increased.

Modified Example 3

A configuration in which the light transmissive plate 196 is held on the shutter face 192A has been exemplified in the second embodiment, and a configuration in which the prism 197 is held on the shutter face 192A has been exemplified in the third embodiment. However, the invention is not limited to the configurations.

For example, as shown in Modified Example 2 described above, a configuration may be employed, in which a through-hole is formed at the position of the shutter 192 in the shutter holder 191, and the light transmissive plate 196 or the prism 197 is fixed in the through-hole. Also in this case, as shown in FIG. 13, the white reference plate 192C, or the light transmissive plate 196 or the prism 197, closes the window 176A, so that, for example, a trouble that a foreign matter such as an ink mist enters into the interior of the colorimeter 17 can be suppressed.

Modified Example 4

An example in which the light guide is configured of the irregular reflector 171B, 196C, 198C, or 198D, or the prism 197 has been shown in each of the embodiments. However, the invention is not limited to this example. For example, the light from the light source 179 may be guided to the reference measurement position Q using a reflection mirror or the like that regularly reflects incident light. Further, the light from the light source 179 may be guided to the reference measurement position Q by combining the irregular reflector, the prism, the reflection mirror, and the like.

Modified Example 5

In the embodiments, the white reference plate 192C has been exemplified as a reference object. However, the invention is not limited to this example. For example, a reference object may be a white paint or the like applied to the shutter face 192A, and a block-like white reference object may be provided. Moreover, the color of a reference object is not limited to white, and it is sufficient that a reference in carrying out measurement can be set. For example, any color may be employed as long as the reflectance with respect to each wavelength is known. In this case, for example, the amount with respect to each wavelength of the light source, or the like, can be calculated using the known reflectance and a measured value measured by a measuring device such as the colorimeter 17.

Modified Example 6

A configuration in which the light transmissive plate 196 covers the illumination window 177B has been exemplified in the second embodiment. However, the invention is not limited to this configuration. For example, a configuration in which a portion of the illumination window 177B is not covered by the light transmissive plate 196 may be employed. In this case, for example, if the amount of radiation light is too large when light is radiated onto the reference measurement position Q using the light transmissive plate 196, a portion of the light from the light source 179 can be caused to escape so as not to enter the light transmissive plate 196.

Modified Example 7

A configuration in which the first face 197A of the prism 197 covers the illumination window 177B has been exemplified in the third embodiment. However, for example, the first face 197A may be inclined with respect to an opening face (the base bottom face 171A) of the illumination window 177B. Also in this case, light can be radiated at a desired angle onto the reference measurement position Q when an inclination angle of each interface between the optical layers 197D constituting the prism 197 is properly set.

Modified Example 8

A configuration in which the shutter 192 is movable in the X-direction with respect to the carriage 13 by the movement of the shutter holder 191 has been exemplified in the first embodiment. However, the invention is not limited to this configuration. For example, a configuration may be employed, in which the shutter 192 is rotatably provided about the axis of rotation parallel to the Z-direction and is movable to the closed position and the open position by being rotated about the axis of rotation.

Moreover, the shutter 192 is moved by moving the carriage 13 to cause the first end 194 or the second end 195 to abut on the housing 10. However, a driving source such as, for example, a motor may be mounted in the carriage 13, and the shutter 192 may be moved by a driving force from the driving source.

Modified Example 9

In the first embodiment, the colorimeter 17 including the spectroscopic device 173A and the light receiving element 174A has been exemplified as the measuring portion. However, the invention is not limited to this example. The measuring portion may be an imaging portion including, for example, an RGB filter and an imaging element including a plurality of pixels.

Moreover, a configuration including a plurality of measuring devices may be employed. For example, a configuration may be employed, in which the colorimeter 17 and the imaging portion including the imaging element as described above are provided in the carriage 13. In this case, it is preferable that the shutter 192 described in each of the embodiments is provided corresponding to each of the measuring devices (the colorimeter 17 and the imaging portion).

Modified Example 10

In the first embodiment, a so-called inkjet printer including the printing portion 16, which forms an image by discharging ink, has been exemplified as a printer. However, the printer is not limited to this example. The configuration of each of the embodiments can be applied to a printer including a printing portion that forms an image by transferring an image forming material to the medium M. Examples of the printer include, for example, a so-called thermal transfer printer that transfers an image to the medium M by heat-melting an ink ribbon as the image forming material, or a so-called electrophotographic printer that develops a latent image using a toner and transfers the developed image to the medium M. Even when the configuration of each of the embodiments is applied to printers other than the printer of an inkjet system as described above, the stain or deterioration of an optical device due to a scattered image forming material can be suitably suppressed.

Moreover, the printer 1 has been exemplified as an electronic apparatus. However, the electronic apparatus is not limited to this example. For example, the electronic apparatus may be a measuring device that carries out only the measurement of the medium M without including the printing portion 16. Moreover, the optical module may be incorporated into a quality inspection device that performs a quality inspection of a printed matter manufactured in, for example, a factory or the like. In addition, the optical module may be incorporated into any electronic apparatus.

In addition, a specific structure in carrying out the invention can be appropriately changed to other structures or the like within a range capable of achieving the advantage of the invention.

The entire disclosure of Japanese Patent Application No. 2017-138795 filed Jul. 18, 2017 is expressly incorporated by reference herein.

What is claimed is:
1. An optical module for a colorimeter comprising:
  a base having a first window and a second window;
  a light source that is disposed in the base and radiates initial light through the second window onto a measurement position of a measurement target in a direction crossing a measurement optical axis;
  an incident optical system that is disposed in the base and receives reflected light, the reflected light being obtained by reflecting the initial light at the measurement position of the measurement target, the reflected light traveling along the measurement optical axis through the first window;
  a shutter having a shutter face facing the first window and the second window of the base;
  a shutter holder supporting the shutter, the shutter holder being configured to open or close the first window with the shutter;
  a reference object disposed on at least a part of the shutter face; and
  a light guide disposed between the base and the shutter face;
  wherein the first window and the second window face the shutter face of the shutter when the first window is closed with the shutter so that the light guide diffusively guides the initial light from the second window to the reference object.
2. The optical module for a colorimeter according to claim 1, wherein
  the light guide is a prism that refracts the initial light from the light source toward the reference object.
3. The optical module for a colorimeter according to claim 2, wherein
  the prism covers the second window when the first window is closed by the shutter.
4. An electronic apparatus comprising:
  the optical module according to claim 2; and a controller that controls a measuring process performed by the colorimeter.

5. An electronic apparatus comprising:
the optical module according to claim 3; and
a controller that controls a measuring process performed by the colorimeter.

6. The optical module for a colorimeter according to claim 1, wherein
the light guide includes an irregular reflector that irregularly reflects the initial light from the light source.

7. The optical module for a colorimeter according to claim 6, further comprising a light transmissive member disposed closer to the base than the shutter when the first window is closed by the shutter, wherein
the irregular reflector is provided at a position that is spaced apart from the measurement optical axis when the first window is closed by the shutter, the irregular reflector is provided on at least one of a first face of the light transmissive member that faces the base and a second face of the light transmissive member, and the second face is opposite to the first face.

8. The optical module for a colorimeter according to claim 6, wherein
the shutter closed the first window while the shutter is located at a position spaced apart from the base by a predetermined dimension, and
the irregular reflector is provided at a position that is spaced apart from the measurement optical axis when the first window is closed by the shutter, and the irregular reflector is provided on at least one of a face of the base that faces the shutter and a face of the shutter that faces the base.

9. An electronic apparatus comprising:
the optical module according to claim 8; and
a controller that controls a measuring process performed by the colorimeter.

10. An electronic apparatus comprising:
the optical module according to claim 6; and
a controller that controls a measuring process performed by the colorimeter.

11. An electronic apparatus comprising:
the optical module according to claim 7; and
a controller that controls a measuring process performed by the colorimeter.

12. An electronic apparatus comprising:
the optical module according to claim 1; and
a controller that controls a measuring process performed by the colorimeter.

* * * * *